United States Patent
Singh et al.

(10) Patent No.: US 6,319,962 B1
(45) Date of Patent: *Nov. 20, 2001

(54) HYDROCARBON BLOWN RIGID POLYURETHANE FOAMS HAVING IMPROVED FLAMMABILITY PERFORMANCE

(75) Inventors: Sachchida N. Singh, Sicklerville, NJ (US); Joseph S. Costa, Jr., Gilbertsville, PA (US); Rachel E. Berrier, Mt. Laurel, NJ (US)

(73) Assignee: Huntsman International LLC, Salt Lake City, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,351

(22) Filed: May 13, 1999

Related U.S. Application Data

(60) Provisional application No. 60/086,297, filed on May 21, 1998.

(51) Int. Cl.$^7$ .................................................. C08G 18/00
(52) U.S. Cl. ..................... 521/170; 521/107; 521/108; 521/130; 521/131; 521/155; 521/168; 521/169; 521/174
(58) Field of Search .................................. 521/107, 108, 521/130, 131, 155, 170, 174, 168, 169

(56) References Cited

U.S. PATENT DOCUMENTS

| | | | |
|---|---|---|---|
| 4,945,119 | * 7/1990 | Smits et al. ............... | 521/131 |
| 5,688,835 | * 11/1997 | Scherbel et al. .......... | 521/131 |
| 5,728,746 | * 3/1998 | Sicken ....................... | 521/168 |

* cited by examiner

*Primary Examiner*—John M. Cooney, Jr.

(57) ABSTRACT

Rigid polyurethane or urethane modified polyisocyanurate foams having improved flame resistance are disclosed. The foams are prepared from a composition containing (a) an isocyanate, (b) an isocyanate reactive composition, (c) a hydrocarbon/water blowing agent and (d) a phosphorus material.

8 Claims, No Drawings

HYDROCARBON BLOWN RIGID POLYURETHANE FOAMS HAVING IMPROVED FLAMMABILITY PERFORMANCE

This application claims benefit of provisional application Ser. No. 60/086,297 filed May 21, 1998.

BACKGROUND OF THE INVENTION

The present invention relates to closed cell rigid polyurethane or urethane-modified polyisocyanurate foams having improved flammability performance and blown with hydrocarbon blowing agents in combination with a minor amount of water. The invention includes the process used to produce the foams, novel compositions useful in said process and the foams prepared thereby.

Rigid polyurethane foams have many known uses, such as in building materials and thermal insulation. Such foams are known to have excellent flammability performance, outstanding initial and long term thermal insulation and superior structural properties.

Rigid polyurethane foams have conventionally been prepared by reacting appropriate polyisocyanate and isocyanate-reactive compositions in the presence of a suitable blowing agent With regard to blowing agents, chlorofluorocarbons (CFC's) such as trichlorofluoromethane (CFC-11) and dichlorodifluoromethane (CFC-12) have been used most extensively as they have been shown to produce foams having low flammability, good thermal insulation properties and excellent dimensional stability. However, in spite of these advantages, CFC's have fallen into disfavor, as they have been associated with the depletion of ozone in the earth's atmosphere, as well as possible global warming potential. Accordingly, the use of CFC's has been severely restricted.

Hydrochlorofluorocarbons (HCFC's) such as chlorodifluoromethane (HCFC-22), 1-chloro-1,1-difluoroethane (HCFC-142b), and particularly 1,1-dichloro-1-fluoroethane (HCFC-141b) have been considered a viable interim solution. However, HCFC's have also been shown to cause a similar depletion of ozone in the earth's atmosphere and accordingly, their use has also come under scrutiny. In fact, the widespread production and use of HCFC-141b is presently scheduled to end by the year 2002.

Therefore, there has existed a need to develop processes for the formation of rigid polyurethane foams which utilize blowing agents having a zero ozone depletion potential and which still provide foams having low flammability, good thermal insulation properties and excellent dimensional stability.

A class of materials which have been investigated as such blowing agents include various hydrocarbons such as n-pentane, n-butane and cyclopentane. The use of such materials is well-known and disclosed, e.g., in U.S. Pat. Nos. 5,096,933, 5,444,101, 5,182,309, 5,367,000 and 5,387,618. Hydrocarbons offer many advantages such as zero ozone depletion potential, a very low global warming potential, low cost and are liquid at room temperature. One disadvantage of hydrocarbons however is their inherent flammability.

Rigid polyurethane foams used in building construction industry are closed cell in order to trap the blowing agent and benefit from its lower thermal conductivity, i.e., heat insulation capability. But presence of this trapped flammable gas in the cell presents a special challenge in terms of flammability performance of the closed celled foam. Though flammability of such foam has been a concern in general, surface burning characteristics of foam has been of particular concern.

Surface burning characteristics of materials are determined by test methods such as American Society of Testing Materials (ASTM) E 84 "Standard Test Method for Surface Burning Characteristics of Building Materials." It is used to assess the spread of flame on the surface of a material. Popularly known as "Tunnel test," E84 exposes a 24 ft. long by 20 inches wide foam specimen to a controlled air flow and flaming fire exposure, adjusted so as to spread a flame along the entire length of a select grade oak specimen in 5.5 minutes. Generally the test is performed on core foam of chosen thickness but on occasion it is performed on faced products. Flame spread and smoke density are the two parameters measured in the test. The Flame Spread Index (FSI) takes into account both the rate and total distance of the propagation of a flame front, measured visually. The smoke factor is a time-integerated measurement of the occlusion of a visible beam of light. Material performance is put into categories namely 0–25 flame spread index is class I, 26–75 is class II, 76–225 is class III. Smoke limit of 450 is required in each of these classes. ASTM E 84 also has a number of other designations, such as Underwriters Laboratories 723, National Fire Prevention Association 255, or International Conference of Building Officials 8-1.

Since polyurethane foam laminates are used in building construction, it must adhere to the local building code requirement for flammability. When regulating materials, many of the model building codes [such as Building Officials and Code Administrators International Inc. (BOCA), International Conference of Building Officials (ICBO) and Southern Building Code Congress International Inc. (SBCCI)] and insurance rating organizations [such as Underwriters Laboratories (UL); Factory Mutual Research Corporation (FMRC)] refer to quality standards developed by standards-setting organizations such as ASTM. Generally the codes require that the foam core have a flame spread index of 75 or less and a smoke development rating of 450 or less, i.e., meet Class II rating in accordance to ASTM E 84. The rigid polyurethane based laminate boardstock used in the building insulation applications has exceeded this requirement and have historically been rated as Class I in the ASTM E-84 flammability test. Thus HCFC-141b blown foam currently used in the market place or CFC-11 blown foam used prior to 1993 phaseout of CFCs have been Class I.

A widely used method to improve the flammability performance of hydrocarbon blown closed cell rigid foam has been to add water to the formulation which when reacted with isocyanate releases carbon dioxide. This reduces the amount of hydrocarbon trapped in the closed cells of the foam. Adding water and thus reducing hydrocarbon has deleterious effects on foam's insulation properties and its structural properties, especially at low density. Use of water reduces the amount of low thermal conductivity gas (i.e. hydrocarbon as opposed to carbon dioxide) in the closed cells of the foam. This is not desirable as a key attribute of closed cell rigid polyurethane foam is its good insulation properties and good structural properties all at low densities.

Other attempts to improve the flammability performance in general and surface burning characteristics in particular of hydrocarbon blown closed cell rigid foam has centered around adding a halogenated blowing agent (e.g., U.S. Pat. No. 5,384,338; U.S. Pat. No. 5,385,952; U.S. Pat. No. 5,420,167, and U.S. Pat. No. 5,556,894) to the foam formulation. Such attempts have met with limited success. Known methods for producing foams using hydrocarbon as blowing agent and reaction systems used in such methods have not been found to produce rigid polyurethane foams having good flammability performance, in particular class I rating in ASTM E 84 test, and commercially attractive thermal and structural properties at densities which are sufficiently low to make their use feasible. In short, the flammability performance associated with such hydrocarbon blown foams have generally been inferior to CFC and HCFC blown foams.

Accordingly, there remains a need for a process for the production of closed celled rigid polyurethane or urethane-modified polyisocyanurate foam which utilizes hydrocarbon blowing agent with minor amount of water and which provides foams having good flammability performance, in particular class I rating in ASTM E 84 test.

It is an object of the present invention to provide closed celled rigid polyurethane or urethane-modified polyisocyanurate foams blown with hydrocarbons which have good thermal insulation and structural properties along with the improved fire properties.

It is another object of the present invention to provide closed celled rigid polyurethane or urethane-modified polyisocyanurate foams blown with hydrocarbon which provides the above fire, insulation and structural properties at low densities (comparable to those used for CFC or HCFC blown foam) using minimal amounts of halogens. Lower halogen levels enhance the environmental acceptability of the foam.

SUMMARY OF THE INVENTION

It has now been found that closed cell rigid polyurethane or urethane-modified polyisocyanurate foams having excellent flammability performance and good thermal and structural properties can be obtained by using the following formulation:

1) an organic polyisocyanate,
2) a blowing agent comprising
   (a) a hydrocarbon
   (b) water in an amount greater than 0 but less than or equal to 1.0% by weight, based on total weight of foam-forming reaction mixture
3) a polyfunctional isocyanate-reactive composition and
4) a phosphorous compound.

In order to produce the desired foams the amount of elemental phosphorus or organo-phosphorous compounds used is such that the amount of phosphorous is between 0.3 to 2% by weight and there is no more than 1.5% halogen, all based on the total weight of the foam forming reaction mixture.

Closed cell rigid polyurethane or urethane-modified polyisocyanurate foam made with the above composition meets class I rating, i.e. flame spread index less than or equal to 25 and smoke density of 450 or less, when subjected to ASTM E 84 testing.

DETAILED DESCRIPTION OF THE INVENTION

This invention relates to a process and composition for the production of closed cell rigid polyurethane or urethane-modified polyisocyanurate foam having excellent flammability performance and good thermal and structural properties. These foams are obtained by using the following formulation. The composition comprises:

1) an organic polyisocyanate,
2) a blowing agent comprising
   (a) a hydrocarbon and,
   (b) water in an amount greater than 0 but less than or equal to 1.0% by weight, based on the total weight of foam-forming reaction mixture
3) a polyfunctional isocyanate-reactive composition and
4) a phosphorous compound wherein the amount of phosphorous compound used is such that the amount of phosphorous is between 0.3 to 2% by weight and there is no more than 1.4% halogen, all based on the total weight of the foam forming reaction mixture.

Closed cell rigid polyurethane or urethane-modified polyisocyanurate foam made with the above composition meets class I rating, i.e. flame spread index less than or equal to 25 and smoke density of 450 or less, when subjected to ASTM E 84 testing.

A detailed description of the components used in this invention is given below in the same order as the composition specified above.

(1) Organic polyisocyanate: Organic polyisocyanates suitable for use in the present invention include any of the polyisocyanates known in the art for the production of rigid polyurethane or urethane-modified polyisocyanurate foams. In particular, useful organic polyisocyanates include those having a functionality equal to or greater than 2.0 such as diphenylmethane diisocyanate (MDI) in the form of its 2,4'- and 4,4'-isomers and mixtures thereof, mixtures of diphenylmethane diisocyanate and oligomers thereof (known as "crude" MDI) and polymeric MDI (i.e., polymethylene polyphenylene polyisocyanates). Polyisocyanates modified with various groups containing ester groups, urea groups, biuret groups, allophanate groups, carbodiimide groups, isocyanurate groups, uretdione groups and urethane groups may also be used in the process of the present invention. Such modified isocyanates and methods for their preparation are known in the art.

(2a) Hydrocarbon blowing agent: One or more hydrocarbon blowing agents which are vaporizable under foam forming conditions may be used. Suitable hydrocarbons include butane, isobutane, isopentane, n-pentane, cyclopentane, 1-pentene, n-hexane, iso-hexane, 1-hexane, n-heptane, isoheptane, and mixtures thereof. Preferably the hydrocarbon blowing agent is isopentane, n-pentane, cyclopentane or mixtures thereof.

The hydrocarbon blowing agent should be used in an amount of from about 2% to about 20% and preferably from about 4% to about 15% by weight based on the weight of the entire reaction system.

Other physical blowing agents such as vaporizable non-hydrocarbons may also be used in the present process in combination with the hydrocarbon blowing agents. Suitable blowing agents include 1,1,1,3,3-pentafluoropropane (HFC-245fa), 1,1,1,2-tetrafluorethane (HFC-134a), 11-difluoroethane (HFC-152a), difluoromethane (HFC-32), chlorodifluoromethane (HCFC-22), and 2-chloropropane. When used, these blowing agents may be mixed into the isocyanate-reactive component, the isocyanate component and/or as a separate stream to the reaction system.

(2b) Water: Water reacts with isocyanate under foam forming conditions to liberate $CO_2$. Water could be used with any of the physical blowing agents specified in 2(a). Total amount of water is set at less than 1.0% by weight of the total foam formulation to obtain good thermal and structural performance. Preferred results are achieved when the amount of water is less than 0.35%.

The blowing agents are employed in an amount sufficient to give the resultant foam the desired density of less than 4.0 lb/cu.ft, preferably less than 3.5 lb/cu. ft., and most preferably 2.0 lb/cu. ft.

(3) Polyfunctional isocyanate-reactive compositions: The isocyanate-reactive compositions useful in the present invention include any of those known to those skilled in the art to be useful for the preparation of rigid polyurethane foams. Examples of suitable isocyanate-reactive compositions having a plurality of isocyanate-reactive groups include polyester polyols, polyether polyols and mixtures thereof having average hydroxyl numbers of from about 20 to about 1000 and preferably about 50 to 700 mg KOH/g and hydroxyl functionalities of about 2 to about 8 and preferably about 2 to about 6. Other isocyanate-reactive materials which can be used in the present invention include hydrogen terminated polythioethers, polyamides, polyester amides, polycarbonates, polyacetals, polyolefins, polysiloxanes, and polymer polyols.

Suitable aromatic polyester polyols include those prepared by reacting a polycarboxylic acid and/or a derivative thereof or an anhydride with a polyhydric alcohol, wherein at least one of these reactants is aromatic. The polycarboxylic acids may be any of the known aliphatic, cycloaliphatic, aromatic, and/or heterocyclic polycarboxylic acids and may be substituted, (e.g., with halogen atoms) and/or unsaturated. Examples of suitable polycarboxylic acids and anhydrides include oxalic acid, malonic acid, glutaric acid, pimelic acid, succinic acid, adipic acid, suberic acid, azelaic acid, sebacic acid, phthalic acid, isophthalic acid, terephthalic acid, trimellitic acid, trimellitic acid anhydride, pyromellitic dianhydride, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, and dimeric and trimeric fatty acids, such as those of oleic acid which may be in admixture with monomeric fatty acids. Simple esters of polycarboxylic acids may also be used such as terephthalic acid dimethylester, terephthalic acid bisglycol and extracts thereof.

Examples of suitable aromatic polycarboxylic acids are: phthalic acid, isophthalic acid, terephthalic acid, and trimellitic acid. Suitable aromatic polycarboxylic acid derivatives are: dimethyl or diethyl esters of polycarboxylic acids such as phthalic acid, isophthalic acid, terephthalic acid, and trimellitic acid. Examples of suitable aromatic anhydrides are phthalic anhydride, tetrahydrophthalic anhydride, and pyromellitic anhydride.

While the polyester polyols can be prepared from substantially pure reactant materials as listed above, more complex ingredients may be advantageously used, such as the side-streams, waste or scrap residues from the manufacture of phthalic acid, phthalic anhydride, terephthalic acid, dimethyl terephthalate, polyethylene terephthalate, and the like.

The polyhydric alcohols suitable for the preparation of polyester polyols may be aliphatic, cycloaliphatic, aromatic, and/or heterocyclic. The polyhydric alcohols optionally may include substituents which are inert in the reaction, for example, chlorine and bromine substituents, and/or may be unsaturated. Suitable amino alcohols, such as monoethanolamine, diethanolamine or the like may also be used. Examples of suitable polyhydric alcohols include ethylene glycol, propylene glycol, polyoxyalkylene glycols (such as diethylene glycol, polyethylene glycol, dipropylene glycol and polypropylene glycol), glycerol and trimethylolpropane. Examples of suitable aromatic polyhydric alcohols are 1,4, benzene diol, hydroquinone di (2-hydroxyethyl) ether, bis (hydroxyethyl) terephthalate, and resorcinol.

There are many polyester polyols commercially available. Stepanpol® PS-2352, PS-2402, PS-3152 are some such polyols manufactured by the Stepan Company. Terate®2541, 254, 403, 203 are some such polyols, manufactured by Hoechst-Celanese Corporation,. Terol® 235, 235N, 250 are some such polyols manufactured by Oxid, Inc.

Suitable polyether polyols include reaction products of alkylene oxides, e.g., ethylene oxide and/or propylene oxide, with initiators containing from 2 to 8 active hydrogen atoms per molecule. Suitable initiators include polyols, e.g., diethylene glycol, glycerol, trimethylolpropane, triethanolamine, pentaerythritol, sorbitol, methyl glucoside, mannitol and sucrose; polyamines, e.g., ethylene diamine, toluene diamine, diaminodiphenylmethane and polymethylene polyphenylene polyamines; amino alcohols, e.g., ethanolamine and diethanolamine; and mixtures thereof. Preferred initiators include polyols and polyamines.

Additional useful isocyanate-reactive materials include primary and secondary diamines (Unilink 4200), enamines, cyclic ureas, cyclic carbonate, and polycarboxylic acid. Some of these compounds react with isocyanate to evolve carbon dioxide and contribute to foam blowing.

The isocyanate-reactive material is used in an amount of about 15% to about 70% and preferably about 20% to about 60% by weight of the total reaction system.

(4) Organo-phosphorous compounds: Various phosphorous containing organic compounds can be used. Suitable compounds include phosphates, phosphites, phosphonates, polyphosphates, polyphosphites, polyphosphonates, and ammonium polyphosphate. Suitable phosphate compounds are the following:

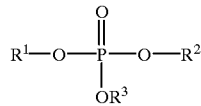

Where $R^1$ to $R^3$ signifies alkyl, halogen substituted alkyl, aryl, halogen substituted aryl and cycloalkyl groups. Preferred phosphates are those where $R^1$ to $R^3$ signifies $C_1$–$C_{12}$ alkyl, $C_1$–$C_{12}$ halogen substituted alkyl, phenyl, cresyl, halogen substituted phenyl and $C_5$–$C_{10}$ cycloalkyl groups. More preferred phosphates are those where $R^1$ to $R^3$ signifies $C_1$–$C_8$ alkyl, $C_1$–$C_8$ halogen substituted alkyl, and phenyl groups. Most preferred phosphate compounds are those where $R^1$ to $R^3$ signifies $C_1$–$C_4$ alkyl, $C_1$–$C_4$ halogen substituted alkyl, and phenyl groups. Some specific compounds under most preferred phosphates are, tributyl phosphate, tris(2-chloropropyl)-phosphate (Antiblaze 80 from Albright & Wilson), t-butylphenyl diphenylphosphate (Phosflex 71B from Akzo Nobel), triethyl phosphate (TEP from Eastman), tributyl phosphate (Phosflex 4 from Akzo Nobel), chloropropyl bis(bromopropyl) phosphate (Firemaster FM836 from Great Lakes). Suitable phosphite compounds are the following:

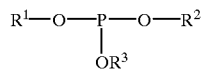

Where $R^1$ to $R^3$ signifies H, alkyl, halogen substituted alkyl, aryl, halogen substituted aryl and cycloalkyl groups. Preferred phosphites are those where $R^1$ to $R^3$ signifies $C_1$–$C_{12}$ alkyl, $C_1$–$C_{12}$ halogen substituted alkyl, phenyl, cresyl, halogen substituted phenyl and $C_5$–$C_{10}$ cycloalkyl groups. More preferred phosphites are those where $R^1$ to $R^3$ signifies, $C_1$–$C_8$ alkyl, $C_1$–$C_8$ halogen substituted alkyl, and phenyl groups. Most preferred phosphite compounds are those where $R^1$ to $R^3$ signifies $C_1$–$C_4$ alkyl, $C_1$–$C_4$ halogen substituted alkyl, and phenyl groups. Some specific compounds under most preferred phosphites are triethyl phosphite (Albrite TEP from Albright & Wilson), tris(2-chloroethyl)-phosphite, triphenyl phosphite (Albrite TPP). Suitable phosphonate compounds are the following:

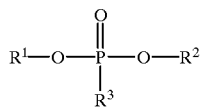

Where $R^1$ to $R^3$ signifies alkyl, halogen substituted alkyl, aryl, halogen substituted aryl and cycloalkyl groups. Preferred phosphonates are those where $R^1$ to $R^3$ signifies $C_1$–$C_{12}$ alkyl, $C_1$–$C_{12}$ halogen substituted alkyl, phenyl, cresyl, halogen substituted phenyl and $C_5$–$C_{10}$ cycloalkyl groups. More preferred phosphonates are those where $R^1$ to $R^3$ signifies $C_1$–$C_8$ alkyl, $C_1$–$C_8$ halogen substituted alkyl, and phenyl groups. Most preferred phosphonate compounds are those where $R^1$ to $R^3$ signifies $C_1$–$C_4$ alkyl, $C_1$–$C_4$ halogen substituted alkyl, and phenyl groups. Some specific compounds under most preferred phosphonates are diethyl ethyl phosphonate (Antiblaze 75 or Amgard V490 from Albright & Wilson), dimethyl methyl phosphanate (Amgard DMMP), bis(2-chloroethyl), 2-chloroethyl phosphonate. Especially preferred results are obtained when one of these preferred phosphonates are included in the composition.

Illustrative examples of polyphosphate compound are Amgaurd V-6, a chlorinated diphosphate ester, from A&W. Illustrative examples of ammonium polyphosphate [$(NH_4PO_3)_n$; n=about 1000) is Hostaflam AP 422 from Hoechst AG and many products from A&W.

The organo-phosphorous compounds used in the invention may have one or more isocyanate-reactive hydrogens being hydroxyl groups, amino groups, thio groups, or mixtures thereof. Suitable compounds include monomeric or oligomeric phosphates, phosphites, and phosphonates polyols. Suitable isocyanate-reactive phosphate compounds are those prepared by (1) the reaction of polyalkylene oxides with (a) phosphoric acids (b) partial esters of phosphoric acids; (2) the reaction of aliphatic alcohols with (a) phosphoric acids (b) partial esters of phosphoric acids; and (3) by transesterification of products of (1) and (2). The preferred compounds include tributoxyethyl phosphate [Phosflex T-BEP from Akzo]; oligomeric organophosphate diol [Hostaflam TP OP 550 from Hoechst AG]; ethoxylated phosphate esters [Unithox X-5126 from Petrolite]; mono- and diesters of phosphoric acid and alcohols [Unithox X-1070 from Petrolite].

Suitable isocyanate-reactive phosphite compounds are those prepared by (1) the reaction of polyalkylene oxides with (a) phosphorous acids (b) partial esters of phosphorous acids; (2) the reaction of aliphatic alcohols with (a) phosphorous acids (b) partial esters of phosphorous acids; and (3) by transesterification of products of (1) and (2).

Suitable isocyanate-reactive phosphonate compounds are those prepared (1) by the reaction of polyalkylene oxides with phosphonic acids, (2) by the reaction of phosphite polyols with alkyl halides; (3) by the condensation of dialkyl phosphonates, diethanolamine and formaldehyde; (4) by transesterification of products of (1) (2) and (3); and (5) by reaction of dialkyl alkyl phosphonate with phosphorous pentaoxide and alkylene oxide. The preferred compounds include diethyl N,N-bis(2-hydroxyethyl) aminoethyl phosphanate [Fyrol 6 from Akzo]; hydroxyl containing oligomeric phosphonate [Fyrol 51 from Akzo];

Elemental phosphorous can also be used.

The amount of said organo-phosphorous compound used is such that the amount of phosphorus is between 0.3 to 2% by weight and if the compound contains halogen there is no more than 1.4% halogen, based on the total weight of the foam forming reaction mixture. Preferred amount of phosphorous is between 0.4 to 1.5% and most preferred is 0.5 to 1.0% by weight, based on the total weight of the foam forming reaction mixture. Also preferably there is no more than 1.25% and most preferred no more than 1.0% by weight of halogens, based on the total weight of the foam forming reaction mixture.

(5) Additives: One or more other auxiliaries or additives conventional in formulations for the production of rigid polyurethane and urethane-modified polyisocyanurate foams may be included in the reaction system. Such optional additives include, but are not limited to: crosslinking agents, foam-stabilizing agents or surfactants, catalysts, infra-red opacifiers, cell-size reducing compounds, viscosity reducers, compatibility agents, mold release agents, fillers, pigments, and antioxidants. The various auxiliary agents and additives as needed for a particular purpose are generally added to the isocyante reactive composition. Suitable auxiliaries and additives include crosslinking agents, such as triethanolamine and glycerol; foam stabilizing agents or surfactants, such as siloxane-oxyalkylene copolymers; oxyethylene-oxyalkylene copolymer; catalysts, such as tertiary amines, (e.g., dimethylcyclohexylamine, pentamethyl diethylenetriamine, 2,4,6-tris(dimethylaminomethyl) phenol, triethylenediamine); organometallic compounds (e.g., potassium octoate, potassium acetate, dibutyl tin dilaurate), quaternary ammonium salts (e.g., 2-hydroxypropyl trimethylammonium formate) and n-substituted triazines (N,N',N"-dimethylaminopropylhexahydrotriazine); viscosity reducers such as propylene carbonate, 1-methyl-2-pyrrolidinone, halogeneated hydrocarbons; infra-red opacifiers such as carbon black, titanium dioxide, metal flakes; cell-size reducing compounds such as inert, insoluble fluorinated compounds, perfluorinated compounds; reinforcing agents such as glass fibers, ground up foam waste; mold release agents, such as zinc stearate; antioxidents, such as butylated hydroxy toluene; and pigments such as azo-/diazo dyestuff, phthalocyanines.

The amount of such additives is generally between 0.1–20%, preferably between 0.3–15% and most preferably between 0.5–10%, by weight based on 100% of the total foam formulation.

In operating the process for making rigid foams according to this invention, the known one-shot, prepolymer or semi-prepolymer techniques may be used together with conventional mixing methods including impingement mixing. The rigid foam may be produced in the form of slabstock, mouldings, cavity filling, sprayed foam, frothed foam or laminates with other material such as paper, metal, plastics, or wood-board.

The various aspects of this invention are illustrated, but not limited by, the following examples. Unless otherwise noted, all temperatures are expressed in degrees Celsius and all formulation components are expressed in parts by weight.

EXAMPLES

The following materials are used in the examples.

Terate® 254: An aromatic polyester polyol of hydroxyl value 235 mg KOH/g, average functionality of around 2 and viscosity of 2,500 cPs @ 25° C. available from Hoechst Celanese Corporation.

Pelron® 9540A: Potassium octoate in diethylene glycol available from Pelron Corp.

Dabco® TMR-2: N-(2-hydroxypropyl)-N-trimethylammonium formate in dipropylene glycol available from Air Products.

Polycat®5: Pentamethyl diethylenetriamine available from Air Products.

Polycat®8: Dimethycyclohexylamine available from Air Products.

Polycat®41: An amnine ctalyst available from Air Products.

Tegostab®B8469: A silicone surfactant available from Goldschmidt Corporation.

Cyclopentane: Available from Exxon Chemical Company and having purity >95%.

Isopentane: Available from Phillips Chemical Company and having purity >97%.

TCPP: Tri(beta-chloropropyl)phosphate (% P=9.5) available from many companies including Akzo Nobel Chemical Inc.

Antiblaze®75: Diethylethylphosphonate (DEEP, % P=18.7) available from Albright & Wilson Americas. Inc. under the tradename.

Great Lakes DE-60F™ Special: Pentabromodiphenyl oxide/aromatic phosphate available from Great Lakes Chemical Corporation.

Rubinate®1850: A high functionality polymeric MDI available from ICI Americas.

Rigid polyurethane foam laminate boards were prepared using the formulations shown in Table 1. Laminate board samples were made on an OMS laminator. The laminator is 24.3 feet (7.4 meters) long and can produce boards up to 39 inches (1 meter) wide and 7.9 inches (20 centimeters) thick. The conveyor can be heated to 158° F. and the laydown table to 122° F. The output is 16–33 pounds per minute. All laminates were made to a thickness of 1.5 inches and 39 inches wide, using typical black glass facer from GAF corporation.

The processing conditions for making the laminates are shown in the following Table.

TABLE

| Laydown Table (° F.) | Room Temperature |
|---|---|
| Laminator conditions | |
| Laminator Top (° F.) | 140 |
| Laminator Bottom (° F.) | 149 |
| Chemicals (Tank Temperature) (° F.) | 82 |
| Number of Streams | 5 |

The foam core density was measured following ASTM D 1622. The closed cell content was measured following ASTM D2856.

Fire performance was tested on 1.3" foam taken from the core of the laminates using the ASTM E 84 test method.

Thermal properties of the foam laminates were measured according to the procedures set forth in ASTM C 518. Thermal aging was performed at room temperature on the full thickness laminate. In thermal property evaluations, the lower the k-factor, the better the insulation performance of the foam.

The structural performance of the foam was measured on foams taken from core of the laminates. The low temperature dimensional stability was measured after 7 days of exposure at −25° C. following the "Dimvac method" described in "Techniques to Assess the Various Factors Affecting the Long Term Dimensional Stability of Rigid Polyurethane Foam," *Proceedings of the Polyurethane 1995 Conference*, Page 11 (1995). The dimensional stability of the foam was measured after 14 days exposure at 158° F./97% RH following ASTM D2126. In dimensional stability test, the closer the % linear change is to zero, the better the dimensional performance of the foam.

Structural property of the foam is also characterized by compressive strength measurements. They were measured parallel to rise and perpendicular to rise (in both machine and cross-machine directions) following the ASTM D1621, Procedure A. Generally, higher the compressive strength, better the structural performance of foam.

Foams #1, #4 and #6 represent foams prepared using the formulations according to this invention. All foams were blown with hydrocarbon as the blowing agent with additional blowing from water plus isocyanate reaction.

Foams #1 and #4 which have a density of 1.8 and 1.7 pcf respectively were rated as Class I in the ASTM E-84 tests and had thermal and structural properties as good as foam #2, #3 and #5 which were rated as Class II in the ASTM E-84 test. Similarly Foam #6 which was blown with essentially hydrocarbon and very little water still was rated as Class I in the ASTM E-84 tests and had thermal properties as good as foam #2, #3 and #5 which were rated as Class II in the ASTM #-84 test.

By comparison Foams #2, #3 and #5 do not come within the scope of this invention and do not meet the Class I rating in accordance with ASTM E-84.

TABLE 1

| Samples, % of total foam | #1 | #2 | #3 | #4 |
|---|---|---|---|---|
| Terate ® 254 | 25.53 | 25.53 | 25.53 | 29.14 |
| Dabco ® TMR-2 | 1.00 | 1.00 | 1.00 | 1.00 |
| Pelron ® 9540a | 0.58 | 0.58 | 0.58 | 0.58 |
| Polycat ® 5 | 0.04 | 0.04 | 0.04 | 0.04 |
| Tegostab ® B8469 | 0.61 | 0.61 | 0.61 | 0.61 |
| Cyclopentane | 3.98 | 3.98 | 3.98 | 3.98 |
| Isopentane | 2.69 | 2.69 | 2.69 | 2.69 |
| Water | 0.15 | 0.15 | 0.15 | 0.15 |
| Rubinate ® 1850 | 61.06 | 61.07 | 61.07 | 57.46 |
| Fire retardants | | | | |
| TCPP | 2.88 | 4.32 | 2.88 | 2.88 |
| Antiblaze ® 75 | 1.44 | 0 | 0 | 1.44 |
| Great Lakes DE-60F ™ Special | 0 | 0 | 1.44 | 0 |
| % Phosphorous | 0.543 | 0.410 | 0.302 | 0.543 |
| % halogen | 0.936 | 1.404 | 1.685 | 0.936 |
| Isocyanate Index | 325 | 325 | 325 | 275 |
| Closed cell content | 90 | 91 | 91 | 90 |
| Foam core density, pcf | 1.8 | 1.8 | 1.75 | 1.7 |
| Flammability Performance in ASTM E-84 * | | | | |
| Class I or II | I | II | II | I |
| Flame spread index | 25 | 35 | 40 | 25 |
| Smoke density | 65 | 50 | 45 | 70 |
| Thermal Properties of Laminate: k-factor in BTU · in/ft$^2$ · hr · ° F. | | | | |
| Initial | 0.148 | 0.150 | 0.149 | 0.147 |
| After 2 months at room temperature | 0.167 | 0.167 | 0.166 | 0.163 |
| Structural Properties of Foam: Dimensional stability, % linear change | | | | |
| Dimvac at −25° C., | −0.65 | −0.3 | −0.35 | −0.25 |

TABLE 1-continued

| Samples, % of total foam | #1 | #2 | #3 | #4 |
|---|---|---|---|---|
| Dim stab at 70° C., 97% RH Compressive Strength, psi | 1.35 | 0.75 | 0.6 | 0.75 |
| Parallel to rise | 17.5 | 18.1 | 18.2 | 14.6 |

What is claimed is:

1. A reaction system for the production of rigid polyurethane or urethane modified polyisocyanurate foams comprising:
    a) an organic polyisocyanate;
    b) an isocyanate reactive composition containing a plurality of isocyanate reactive groups;
    c) a blowing agent comprising a hydrocarbon and water wherein the amount of water is less than or equal to 1.0% by weight based on the total weight of the reaction system; and
    d) at least one halogen substituted phosphorus material wherein,
        said halogen is present in the amount of no more than 1.4% by weight relative to the total weight of the reaction system, and
        said phosphorus is present in the amount ranging from about 0.3 to about 2% by weight relative to the total weight of the reaction system; and
said foam meets the Class I rating in accordance with ASTM E-84 testing.

2. A reaction system, as claimed in claim 1 wherein the organic polyisocyanate is polyphenylene polymethylene polyisocyanate.

3. A reaction system as claimed in claim 1, wherein the isocyanate-reactive composition is selected from the group consisting of polyether polyols, polyester polyols and mixtures thereof having average hydroxyl numbers of from about 100 to about 1000 KOH/g and hydroxyl functionalities of from about 2 to about 8.

4. A reaction system as claimed in claim 1 wherein the hydrocarbon in the blowing agent is selected from the group consisting of butane, isobutane, isopentane, n-pentane, cyclopentane, 1-pentene, n-hexane, iso-hexane, 1-hexane, n-heptane, isoheptane, and mixtures thereof.

5. A reaction system as claimed in claim 1 wherein the amount of water in the blowing agent is less than or equal to 0.35% by weight based on the total weight of the reaction system.

6. A reaction system as claimed in claim 1 wherein the phosphorus material is an organophosphorus compound selected from the group consisting of phosphates, phosphites, phosphonates, polyphosphates, polyphosphites, polyphosphonates, and ammonium polyphosphate.

7. A process for the production of rigid polyurethane or urethane modified polyisocyanurate foams, said process comprising reacting:
    a) an organic polyisocyanate;
    b) an isocyanate reactive composition containing a plurality of isocyanate reactive groups;
    c) a blowing agent comprising a hydrocarbon and water wherein the amount of water is less than or equal to 1.0% by weight based on the total weight of the reaction system; and
    d) at least one halogen substituted phosphorus material wherein,
        said halogen is present in the amount of no more than 1.4% by weight relative to the total weight of the reaction system, and
        said phosphorus is present in the amount ranging from about 0.3 to about 2% by weight relative to the total weight of the reaction system; and
said foam meets the Class I rating in accordance with ASTM E-84 testing.

8. A rigid polyurethane or urethane modified polyisocyanurate foam prepared from the reaction system of claim 1.

* * * * *